United States Patent [19]
Watanabe

[11] Patent Number: 5,675,727
[45] Date of Patent: Oct. 7, 1997

[54] DIFFERENCE RECORDING APPARATUS HAVING A PROCESSING UNIT, RECORDING UNIT, LOG UPDATE SECTION, AND LOG COMPARATOR USING A CLASSIFICATION KEY IN A LOG OF INPUT DATA

[75] Inventor: Kiyoshi Watanabe, Tokyo, Japan

[73] Assignee: NEC Corporation, Tokyo, Japan

[21] Appl. No.: 445,544

[22] Filed: May 22, 1995

[30] Foreign Application Priority Data

May 23, 1994 [JP] Japan .................................. 6-107342

[51] Int. Cl.$^6$ .................................................. G06F 13/00
[52] U.S. Cl. .................. 395/182.18; 395/182.16; 395/182.21; 395/800; 371/67.1; 371/72
[58] Field of Search .................. 395/182.18, 200.08, 395/600, 182.16, 182.21, 800; 364/578; 371/67.1, 72

[56] References Cited

U.S. PATENT DOCUMENTS

| | | | |
|---|---|---|---|
| 5,043,866 | 8/1991 | Myre, Jr. et al. | 395/600 |
| 5,193,162 | 3/1993 | Bordsen et al. | 395/200.08 |
| 5,321,832 | 6/1994 | Tanaka et al. | 395/600 |
| 5,333,303 | 7/1994 | Mohan | 395/182.18 |
| 5,475,624 | 12/1995 | West | 364/578 |

FOREIGN PATENT DOCUMENTS

| | | |
|---|---|---|
| 0516900 A1 | 9/1992 | European Pat. Off. . |
| 57-85141 | 5/1982 | Japan . |
| 5-88947 | 4/1993 | Japan . |
| 1168414 | 10/1969 | United Kingdom . |

Primary Examiner—Thomas C. Lee
Assistant Examiner—Po C. Huang
Attorney, Agent, or Firm—Foley & Lardner

[57] ABSTRACT

A difference recording apparatus includes a log comparator, a processing unit, a recording unit, and a log update section. The log comparator detects a log difference by using a classification key in a log of input data. The processing unit restores the log by using difference data from the log comparator. The recording unit records the log restored by the processing unit. The log update section limits recording of a log of identical data in the recording unit within a unit time on the basis of the presence/absence of a difference detected by the log comparator and an upper limit of log acquisition.

4 Claims, 4 Drawing Sheets

DIFFERENCE RECORDING APPARATUS HAVING A PROCESSING UNIT, RECORDING UNIT, LOG UPDATE SECTION, AND LOG COMPARATOR USING A CLASSIFICATION KEY IN A LOG OF INPUT DATA

BACKGROUND OF THE INVENTION

The present invention relates to a difference recording apparatus and, more particularly, to a difference recording apparatus in a switching system or computer system which includes a processing unit for recording or displaying a log of data including a message.

In update operations, upon occurrence of various kinds of failures, log data are used to restore databases and files to their normal states. If, for example, a central processing unit stops while a database is updated, the database is restored to a normal state by using a log. Also, if past operations are to be canceled after the execution of processing based on a program, the restoration of the initial normal state is required. In such a case as well, a log is used. In this case, a log means a history of update operations in executing a certain operation. This log includes two kinds of log data, i.e., AI (After Image) log data and BI (Before Image) log data.

AI log data is used for a roll forward. That is, every time the contents of a database are updated, the contents after the update processing are stored as log or the like. BI log data is used for a rollback. That is, every time the contents of a database are updated, the contents before the update processing are stored as a log or the like.

As a conventional difference recording apparatus of this type, for example, a log data acquisition apparatus is disclosed in Japanese Patent Laid-Open No. 57-85141.

FIG. 4 shows this conventional log data acquisition apparatus.

Referring to FIG. 4, a conventional log data acquisition apparatus 90 comprises buffers 93 and 95, a difference detector 94, an optimal difference bit string generator 96, a BI log data acquisition unit 97, and an AI log data acquisition unit 98. The buffers 93 and 95 respectively receive blocks of backup data constituting a database or a file, i.e., data 91 before update processing, which is transferred to a CPU, and latest data obtained by updating the data 91 before update processing, i.e., data 92 after update processing. The buffers 93 and 95 temporarily store these data. The difference detector 94 compares the data 91 with the data 92 to detect a difference, and outputs a difference bit string 101. The optimal difference bit string generator 96 generates an optimal difference bit string 102 from the difference bit string 101 output from the difference detector 94. The BI log data acquisition unit 97 acquires BI log data 103 from the optimal difference bit string 102 and the data 91 from the buffer 93 in the form corresponding to the bit-"1" series of the optimal difference bit string 102 with the data 91 being considered as one log unit. The AI log data acquisition unit 98 acquires AI log data 104 from the optimal difference bit string 102 and the data 92 from the buffer 95 in the form corresponding to the bit-"1" series of the optimal difference bit string 102 with the data 92 being considered as one log unit. The BI log data 103 and the AI log data 104 are simultaneously extracted from the BI log data acquisition unit 97 and the AI log data acquisition unit 98 in response to a tag signal 105.

In this conventional log data acquisition apparatus, the difference between input data is recorded, and data restoration is performed in accordance with this recorded difference on an assumption that complete data restoration is performed.

Although an attempt is made to reduce the recording amount in minimizing the amount of log acquired, no limitations are imposed on recording with respect to the limit of a recording capacity.

In this conventional log data acquisition apparatus, when messages regarded as identical data are generated within a unit time in a log recording operation, a difference is detected to realize compression of data to be recorded. However, since the difference between input data is always recorded, the recording capacity for log data needs to be increased by an amount corresponding to the above difference.

SUMMARY OF THE INVENTION

It is an object of the present invention to provide a difference recording apparatus for realizing the limitation of recording with respect to the limit of a recording capacity by giving priority to a reduction in recording amount over restoration of data.

In order to achieve the above object, according to the present invention, there is provided a difference recording apparatus comprising difference detection means for detecting a log difference by using a classification key in a log of input data, processing means for restoring the log by using difference data from the difference detection means, recording means for recording the log restored by the processing means, and recording limiting means for limiting recording of a log of identical data in the recording means within a unit time on the basis of the presence/absence of a difference detected by the difference detection means and an upper limit of log acquisition.

DESCRIPTION OF THE PREFERRED EMBODIMENT

The present invention will be described below with reference to the accompanying drawings.

Figure 1:
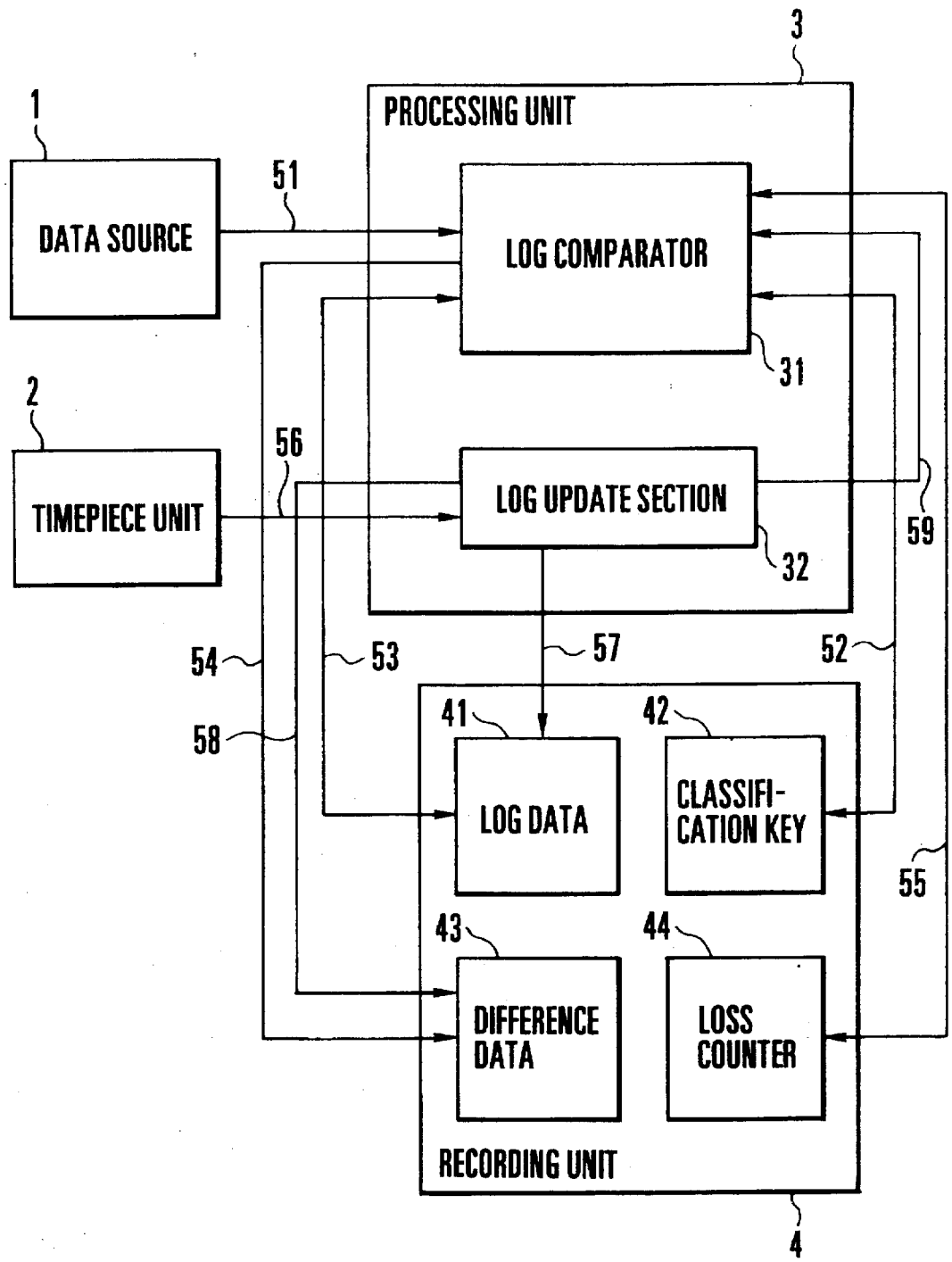
FIG. 1 is a block diagram showing a difference recording system according to an embodiment of the present invention.

FIG. 1 shows a difference recording apparatus according to an embodiment of the present invention.

Referring FIG. 1, this embodiment comprises a data source 1 for generating data on which log acquisition is based, a recording unit 4 for recording log data of the data from the data source 1, log difference data, the upper limit of recording/acquisition of the log data and difference data, and the like, a timepiece unit 2 for generating a periodic output for updating the recording unit 4 with time, and a processing unit 3 for recording the log data and difference data in the recording unit 4 every unit time to realize a reduction in recording amount and limitation of recording.

The recording unit 4 has log data 41, a classification key 42, difference data 43, and a loss counter 44 in predetermined recording areas. The processing unit 3 includes a log comparator 31 as a difference detection means for detecting a difference by using a classification key in a log, and a log update section 32 as a recording limiting means for limiting recording or display of identical data within a unit time by performing an update operation every unit time by using a periodic output from the timepiece unit 2.

The operation of this embodiment will be described next with reference to FIGS. 2A to 2C and 3.

Figure 2A:
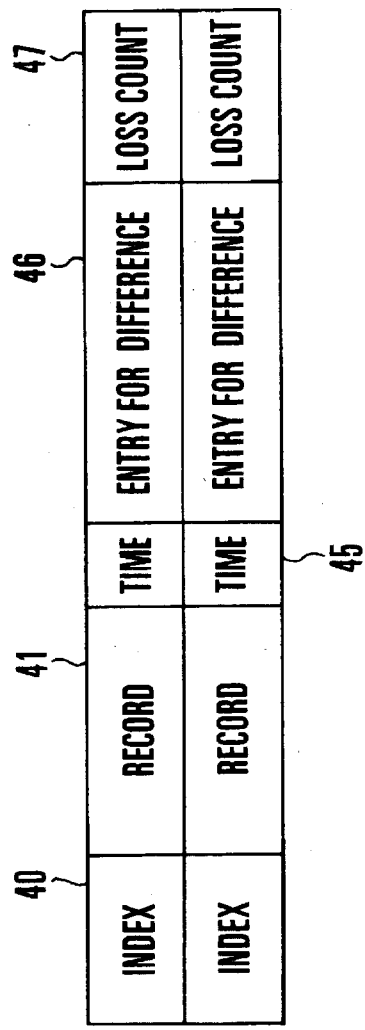
FIGS. 2A, 2B, and 2C are views each showing a data format of control data used in the apparatus in FIG. 1.
Figure 2B:
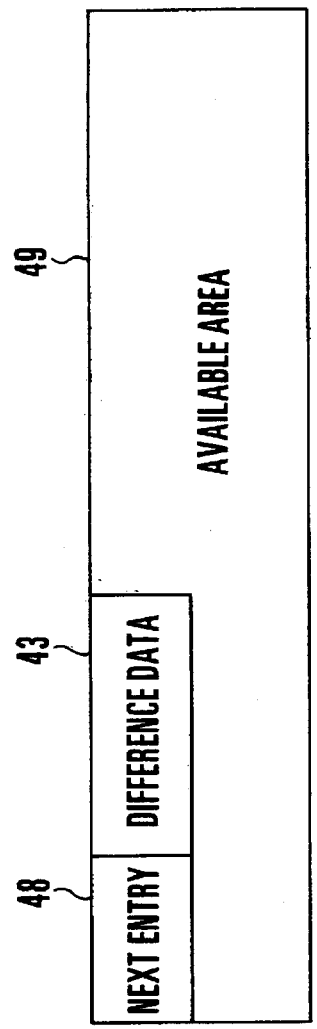
Figure 2C:
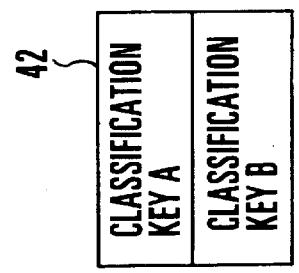
Figure 3:
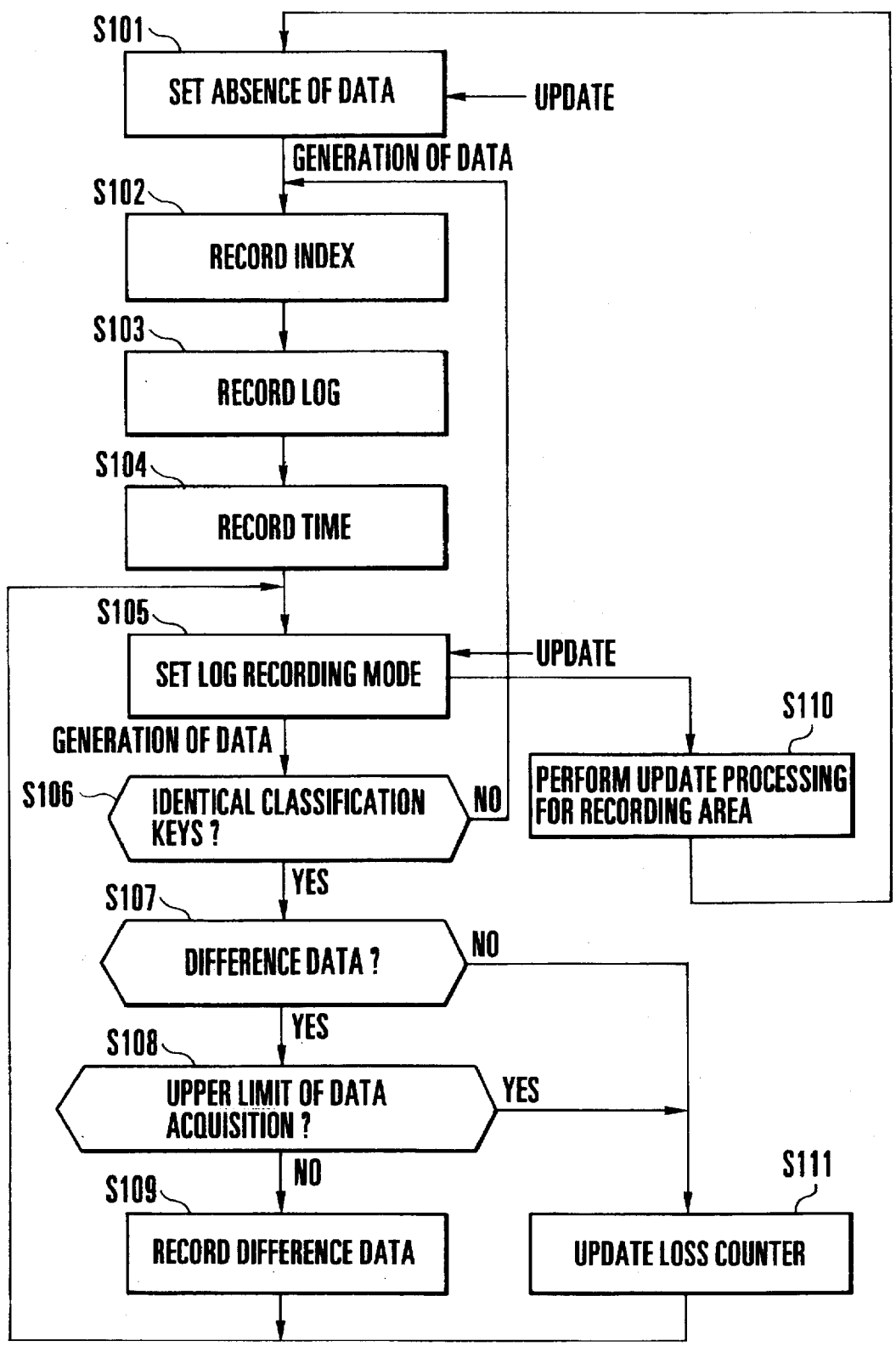
FIG. 3 is a flow chart for explaining the control operation of the difference recording apparatus in FIG. 1.
Figure 4:
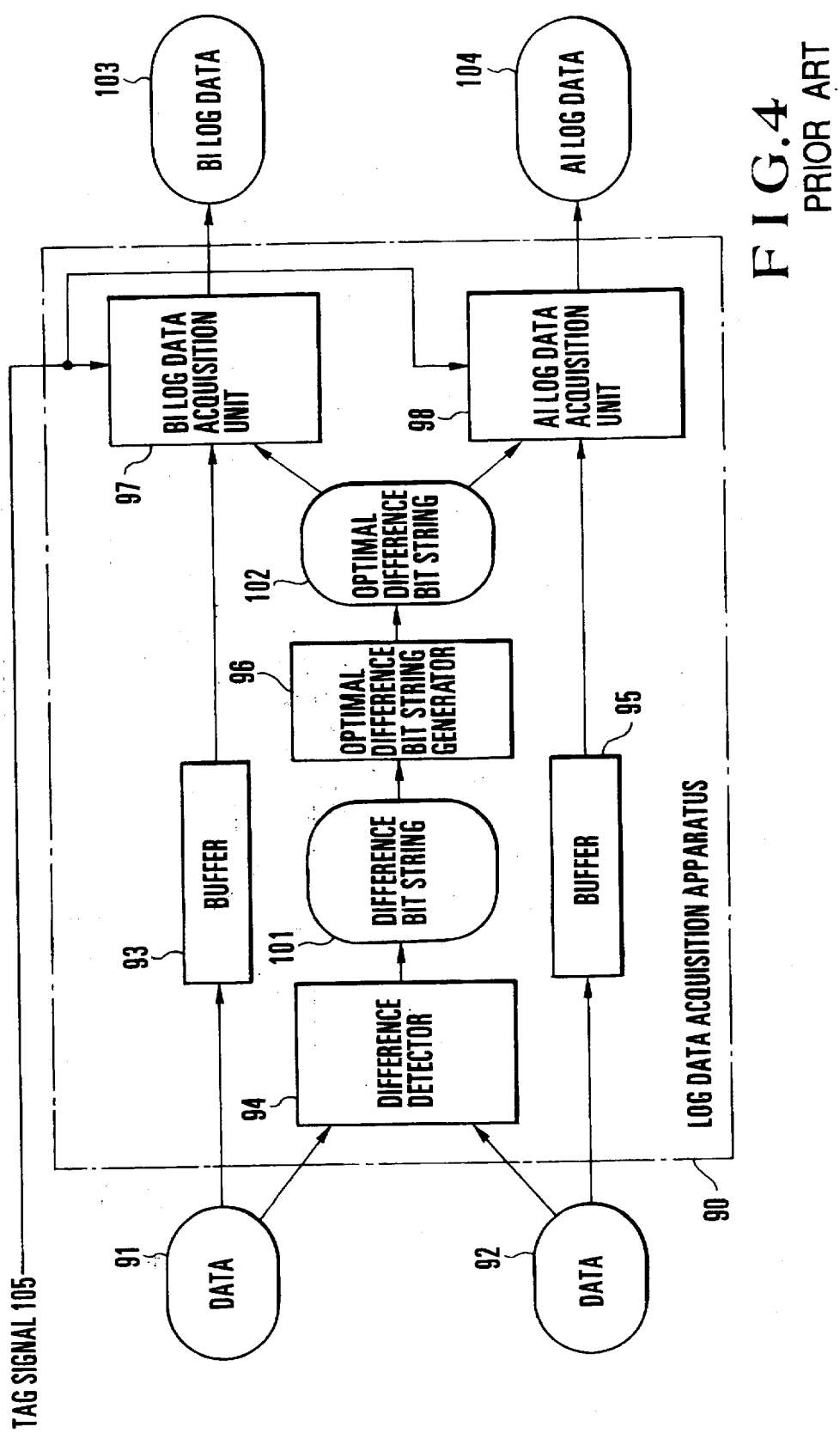
FIG. 4 is a block diagram showing a conventional log data acquisition apparatus.

FIGS. 2A to 2C respectively show examples of the formats of control data in FIG. 1. FIG. 3 explains the control operation of the processing unit in FIG. 1.

FIG. 2A shows a recording area for log data and a loss count. This area is constituted by an index 40 for discriminating the classification key 42, log data 41 as a record, recording time 45 at which recording is performed for the first time, an entry 46 for a difference indicating the start address of difference data, and a loss count 47 indicating the count value of the loss counter 44. Note that log data having identical indexes are regarded as log data having identical classification keys.

FIG. 2B shows a recording area for difference data in FIG. 1. This area is constituted by a next entry 48, the difference data 43, and a remaining available area 49 of the recording capacity, which is used for a whole log.

FIG. 2C shows a recording area for classification keys. This area is constituted by a plurality of classification keys A and B and the like.

Referring to FIG. 3, when data generated by the data source 1 is input to the log comparator 31 via a signal line 51 in the absence of data in a unit time (step S101), the log comparator 31 classifies this data with the classification key 42 sent from the recording unit 4 via a signal line 52. As shown in FIG. 2A, the log comparator 31 records the index 40 in the recording unit 4 via a signal line 53 (step S102). The log comparator 31 then records the log data 41 as a record (step S103), and also records time 45 (step S104). Thereafter, a log recording mode is set (step S105).

When new data is generated by the data source 1 in this log recording mode, the log comparator 31 determines via the signal line 53 whether the data have identical classification keys (step S106).

If YES in step S106, i.e., the data have identical classification keys, it is determined whether there is difference data (step S107). If there is the difference data 43, it is determined whether the upper limit of data acquisition from the signal line 52 has been reached, i.e., there is a remaining recording area (step S108).

If NO in step S108, i.e., the upper limit of data acquisition has not been reached, the difference data 43 shown in FIG. 2B is recorded in the recording unit 4 via a signal line 54 (step S109).

In this case, if there are the entry 46 for a difference, which is shown in FIG. 2A, and the difference data 43, final difference data in a unit time is recorded in the available area 49 by referring to the next entry 48 shown in FIG. 2B.

If NO in step S107, i.e., there is no difference data, or YES in step S108, i.e., the upper limit of data acquisition has been reached, only the loss count 47 of the loss counter 44, which is shown in FIG. 2A, is updated via a signal line 55, and no difference data is recorded (step S111).

When the log update section 32 is started by a periodic output indicating a unit time, which is output from the timepiece unit 2 via a signal line 56, log data is checked via a signal line 57. If the absence of data is set (step S101), no update processing is performed for the recording area for log data. If a log recording mode is set (step S105), update processing is performed for the recording areas for log data and difference data via the signal line 57 and a signal line 58 (step S110). The log comparator 31 is then notified of this operation via a signal line 59. After the update processing for the recording areas, the flow returns to step S101 to set the absence of data. That is, recording and display of a log of identical data are limited in steps S107 and S108 within a unit time, and the absence of data is set to cancel the limitation after the lapse of the unit time.

The log update section 32 may measure a unit time in accordance with time data output from the timepiece unit 2 to perform an update operation in a log recording mode every unit time, instead of starting the log update section 32 by using a periodic output from the timepiece unit 2.

As has been described above, the present invention is made from the point of view that if all data are not referred to within a unit time in referring to log data, all data need not be recorded and held. According to the present invention, the system includes the processing unit for generating difference data in recording or displaying a log of data including a message, restoring the log by using this difference data, and determining the difference data. This system comprises the recording limiting means for limiting recording or display of identical data within a unit time by using a periodic output from the timepiece unit, the difference detection means for detecting a difference by using a classification key in a log, and the recording unit having information used to generate difference data. With this arrangement, since only a portion of a log which is required for reference within a unit time is recorded, the recording amount can be reduced when complete reproduction of restoration data is not required.

Since data regarded as identical data is not recorded, even if a large amount of data having identical keys are generated by bugs in a debugging operation performed by the user or intentional operation errors, the margin of the recording capacity up to the upper limit of data acquisition can be increased.

What is claimed is:

1. A difference recording apparatus, comprising:
   difference detection means for detecting a log difference by using a classification key in a log of input data;
   processing means for restoring the log by using difference data from said difference detection means;
   recording means for recording the log restored by said processing means;
   recording limiting means for limiting recording of a log of identical data in said recording means within a unit time on the basis of the presence/absence of a difference detected by said difference detection means and an upper limit of log acquisition; and
   timepiece means for repeatedly counting a unit time,
   wherein said recording limiting means limits recording of the log of identical data within each unit time counted by said timepiece means;
   wherein said recording limiting means comprises a log update section for updating a log record, said log update section performing update processing for a log recording area in said recording means after the lapse of the unit time in a recording mode,
   wherein said processing means records difference data associated with log data which is being recorded in said recording means, when new data is input in a log recording mode, under a condition that the data have identical classification keys, and the upper limit of log acquisition has not been reached,
   wherein said processing means updates only a loss counter corresponding to log data of said recording means, when new data is input in the log recording mode, under one of conditions that the data have identical classification keys and no difference data is present, and that the upper limit of log acquisition has been reached, and wherein the difference is stored in the difference data and the log, which is considered identical according to the classification key, is deleted and the number of losses are counted by the loss counter, before the time passes for the renewal by the timepiece means, and wherein the difference of the input data is stored in another area and when it is considered that there is no input data difference, the data is deleted to secure a save area.

2. An apparatus according to claim 1, wherein said recording means records log data, difference data, a classification key, a loss counter, and said processing means records log data for every unit time and difference data associated with the log data, as a log record, in said recording means.

3. An apparatus according to claim 1, wherein the log data are classified using the classification key and if the classification is the same, the difference data is recorded when the difference data exists and said data have not reached the upper limit of collection, and the log record is renewed at every time unit.

4. An apparatus according to claim 1, wherein the loss counter only is renewed when the classification key is the same and the difference data does not exist or has reached the upper limit of collection.

* * * * *